United States Patent
Park

(10) Patent No.: US 8,247,107 B2
(45) Date of Patent: Aug. 21, 2012

(54) BATTERY PACK

(75) Inventor: Junyoung Park, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 742 days.

(21) Appl. No.: 12/358,055

(22) Filed: Jan. 22, 2009

(65) Prior Publication Data

US 2009/0246627 A1   Oct. 1, 2009

(30) Foreign Application Priority Data

Mar. 31, 2008   (KR) .................. 10-2008-0030049

(51) Int. Cl.
H01M 2/10 (2006.01)
H01M 2/22 (2006.01)
H05K 5/00 (2006.01)

(52) U.S. Cl. .............. 429/121; 429/7; 439/65; 439/500; 361/752

(58) Field of Classification Search .................. None
See application file for complete search history.

(56) References Cited

U.S. PATENT DOCUMENTS

| | | | |
|---|---|---|---|
| 5,414,928 A | 5/1995 | Bonitz et al. | |
| 5,717,556 A * | 2/1998 | Yanagida | 361/803 |
| 6,608,470 B1 | 8/2003 | Oglesbee et al. | |
| 6,697,259 B1 | 2/2004 | Nakamura | |
| 8,072,304 B2 * | 12/2011 | Kato et al. | 336/200 |
| 2003/0011345 A1 | 1/2003 | Hanafusa et al. | |
| 2003/0013013 A1 | 1/2003 | Nakamura | |
| 2004/0251872 A1 | 12/2004 | Wang et al. | |
| 2005/0263572 A1 | 12/2005 | Nakamura | |
| 2007/0111088 A1 | 5/2007 | Kim | |

FOREIGN PATENT DOCUMENTS

| | | |
|---|---|---|
| CN | 1277741 | 12/2000 |
| CN | 1299579 | 6/2001 |
| EP | 1 091 626 | 5/1999 |
| JP | 05-067484 | 3/1993 |
| JP | 05-235243 | 9/1993 |
| JP | 06-013520 | 1/1994 |
| JP | 2001-326454 | 11/2001 |
| JP | 2002-368372 | 12/2002 |
| JP | 2004-185861 | 7/2004 |
| JP | 2004-311166 | 11/2004 |
| KR | 1020030081934 | 10/2003 |
| KR | 1020040059302 | 7/2004 |
| KR | 1020060037841 | 5/2006 |
| KR | 100659858 | 12/2006 |
| KR | 1020080013040 | 2/2008 |
| WO | WO 99/39400 | 8/1999 |
| WO | WO 2008/018714 | 8/2007 |
| WO | WO 2008/035874 | 3/2008 |

OTHER PUBLICATIONS

Office Action and English Translation dated Jan. 11, 2011 for corresponding CN 200910005305.0.

* cited by examiner

*Primary Examiner* — John S Maples
(74) *Attorney, Agent, or Firm* — Knobbe, Martens, Olson & Bear, LLP

(57) ABSTRACT

A battery pack that enhances the reliability and coupling force of a connection member electrically connecting two protective circuit boards is disclosed. The battery pack includes: a secondary battery including a positive electrode and a negative electrode; a first protective circuit board electrically connected to the battery; a second protective circuit board electrically connected to the first protective circuit board; and at least one conductive plate coupled to one surface of the first protective circuit board and one surface of the second protective circuit board.

20 Claims, 5 Drawing Sheets

BATTERY PACK

CLAIM FOR PRIORITY

This application is based on and claims priority to Korean Patent Application No. 10-2008-0030049 filed on Mar. 31, 2008 in the Korean Intellectual Property Office (KIPO), the entire contents of which are hereby incorporated by reference.

BACKGROUND OF THE INVENTION

1. Field of the Invention

The present invention relates to a battery pack, and more particularly to, a battery pack that enables protective circuit boards coupled to a battery to have structures of high reliability and strong coupling forces.

2. Description of the Related Art

In recent years, compact and light portable electric and electronic appliances such as cellular phones, laptop computers, and camcorders are being actively developed and produced. Such portable electric and electronic appliances have embedded battery packs to allow operation even in places where there is no separate power source. Battery packs are currently employ chargeable and dischargeable batteries as they are more economical. Representative batteries include nickel-cadmium (Ni—Cd) batteries, Nickel-metal hydride (Ni-MH) batteries, lithium batteries, and lithium ion secondary batteries.

In particular, lithium ion batteries have operational voltages around three times higher than those of nickel-cadmium batteries or nickel-metal hydride batteries and are widely used as power sources for portable electronic appliances. In addition, lithium ion batteries are also widely used due to their relatively high energy density per weight.

In a lithium ion secondary battery used in a laptop computer, a plurality of battery cells are connected in series or in parallel in view of the increased power consumption and use time.

In this case, the lithium ion secondary battery for a laptop computer may be realized by a battery pack attachable to and detachable from the laptop computer.

Battery packs have various shapes according to the sizes and efficiencies of laptop computers with which the battery packs are used Since the laptop computers generally have very thin shape, the battery packs are also formed such that they have thicknesses within the thicknesses of the laptop computer.

Further, the battery packs that are detachably mounted to the laptop computers have protective circuits controlling the flows of currents of the batteries as the batteries become overheated, overcurrented, overcharged, overdischarged, or otherwise deteriorated.

In particular, a battery pack for a laptop computer generally employs a plurality of lithium ion secondary batteries, which has an increased possibility of danger. Accordingly, a smart protective circuit having more functions than a general protective circuit controlling one lithium ion secondary battery is mounted to such a battery pack. As the smart protective circuit has diversified functions, its mounting area becomes larger, in which case it occupies a considerable volume inside the battery pack.

In particular, a large amount of current flows through a connector of a battery pack that is connected to a contact portion of a battery of a laptop computer. The connector occupies a considerable space inside the battery pack.

Accordingly, a smart protective circuit is separated onto a board to which a connector is attached and a board to which a protective circuit is attached, in order to more efficiently utilize the interior space of a battery pack.

The separated boards are electrically connected to each other by an electric wire, and a current of up to several tens of Amperes flows through a portion of the electric wire to form a high current path between a positive electrode and a negative electrode of a battery.

However, if the electric wire is not big enough to allow sufficient current to flow, its resistance increases potentially causing overheating of the lithium ion secondary battery due to the obstructed current flow, which can cause explosion or deterioration of the battery. In addition, the coating of the electric wire may be melted by emission of heat, causing a short circuit with other signal wires. In this case, the protective circuit malfunctions or suffers damage, causing decrease of the reliability of the battery pack.

Moreover, the electric wire connecting the separated boards needs to have a sufficient coupling force so as not to be separated from the boards even when the boards are bent or the like in the process of assembling the battery pack.

BRIEF SUMMARY OF THE INVENTION

The present invention has been made in view of the above problems, and the present invention provides a battery pack that improves the reliability of a connection member electrically connecting two protective circuit boards to each other.

The present invention also provides a battery pack that improves the coupling force of a connection member electrically connecting two protective circuit boards to each other.

In accordance with an exemplary embodiment of the present invention, there is provided a battery pack comprising: a secondary battery including a positive electrode and a negative electrode; a first protective circuit board electrically connected to the battery; a second protective circuit board electrically connected to the first protective circuit board; and at least one conductive plate coupled to one surface of the first protective circuit board and one surface of the second protective circuit board.

The conductive plate may include a body having bending regions, and a soldering portion for coupling the first protective circuit board and the second protective circuit to each other by soldering at least portions of the bending region to the first protective circuit board and the second protective circuit.

The at least one conductive plate may be a first conductive plate coupled to the first protective circuit board and the second protective circuit board and a second conductive plate coupled to the first protective circuit board and the second protective circuit board and spaced apart from the first conductive plate.

The first conductive plate may be electrically connected to the positive electrode of the battery and the second conductive plate may be electrically connected to the negative electrode of the battery.

The battery pack may further include a flexible printed circuit board (FPCB) formed between the first conductive plate and the second conductive plate to electrically connect the first protective circuit board and the second protective circuit board to each other. The flexible printed circuit board may be bent in shapes corresponding to the bending regions of the first conductive plate and the second conductive plate.

The conductive plate may have a first electrical connection region in contact with the first protective circuit board, a first bending region extending from the first electrical connection region, a connection region extending from the first bending region, a second bending region extending from the connection region, and a second electrical connection region extending from the second bending region and being in contact with the second protective circuit board.

The soldering portion may include a first soldering portion formed between the first bending region and the first protective circuit board and a second soldering portion formed between the second bending region and the second protective circuit board.

The first electrical connection region may have a shape corresponding to that of the second electrical connection region and is opposite to the second electrical connection region with respect to the center of the connection region, and the first bending region has a shape corresponding to that of the second bending region and is opposite to the second bending region with respect to the center of the connection region.

A central portion of the connection region may be bent so as to maintain the angle between the first protective circuit board and the second protective circuit board by 80 to 100 degrees.

A portion of the first electrical connection region that makes contact with the first protective circuit board may have a rectangular shape, and the soldering portion may have a box-like shape around the portion of the first electrical connection region that makes contact with the first protective circuit board.

The first bending region may have a first bending portion bent from the first electrical connection region and a second bending portion bent in a direction opposite to that of the first bending portion.

The soldering portion corresponding to the first protective circuit board may have a coupling area securing region formed between the first protective circuit board and the first bending portion and a coupling force reinforcing region connected to the coupling area securing region and being formed between the first protective circuit board and the second bending portion.

A distance between a first imaginary tangential line tangential to a full curve point of the first bending portion and a second imaginary tangential line tangential to a full curve point of the second bending portion may be within a range of 3 to 15% of the thickness of the conductive plate.

A distance from the lower surface of each conductive plate and the upper surface of the conductive plate spaced apart from the lower surface by the existence of the bending regions may be within a range of 150 to 250% of the thickness of the conductive plate. The thickness of the conductive plate may be 0.35 mm to 1.1 mm.

The first protective circuit board may include a first insulation substrate, a first printed circuit pattern coupled to the first insulation substrate, and a protective circuit electrically connected to the first printed circuit pattern, and the second protective circuit board includes a second insulation substrate, a second printed circuit pattern coupled to the second insulation substrate, and a protective circuit coupled to the second insulation substrate. The conductive plate may electrically connect the connector and the protective circuit to each other.

An area of one surface of each conductive plate that makes contact with the printed circuit board may be within a range of 70 to 90% of that of the printed circuit board.

The conductive plate may have soldering recesses around its surface making contact with the first protective circuit board and the second protective circuit board respectively.

The connection region is bendable so as to allow the second protective circuit to be mounted so as to extend in a direction that intersects the first protective circuit board.

The conductive plate has a first and a second electrical connection region that couples to the first and second protective circuit board and a connecting region that extends between the first and second electrical connection region, wherein the conductive plate is shaped so that the connection region is spaced from the electrical connection region to thereby permit greater access to the electrical connection regions at the place where the electrical connection regions are coupled to the first and second protective circuit boards for welding therebetween.

Accordingly, the battery pack of the present invention improves reliability by separating a conductive plate, i.e. a connection member electrically connecting two protective circuit boards to each other from a flexible printed circuit board.

Furthermore, the battery pack of the present invention improves coupling force by allowing a conductive plate, i.e. a connection member electrically connecting two protective circuit boards to each other, to strongly couple two protective circuit boards to each other.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Figure 1A:
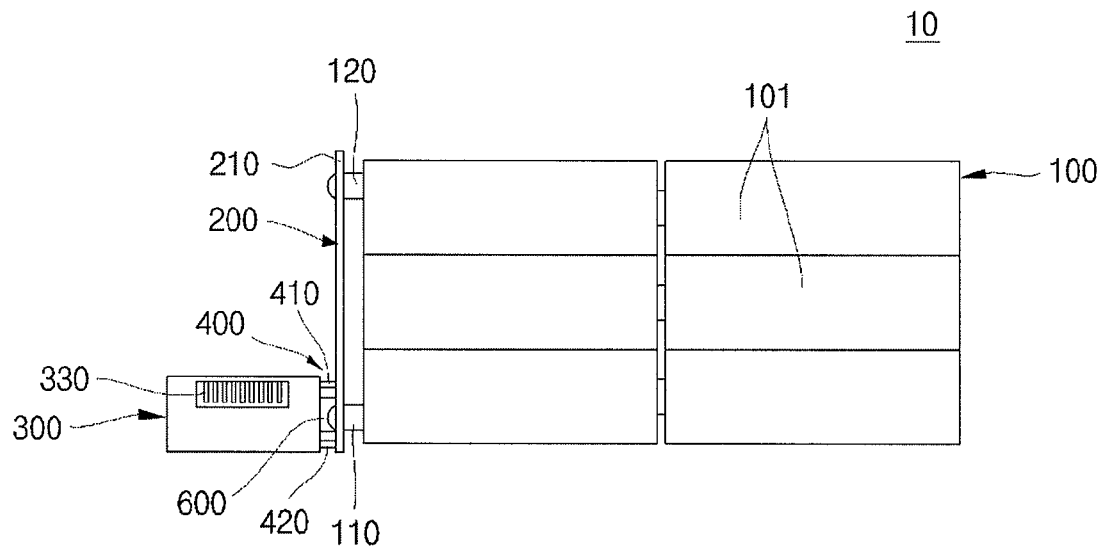
FIG. 1A is a top view illustrating a battery pack according to an embodiment of the present invention.

Hereinafter, exemplary embodiments of the present invention will be described in detail with reference to the accompanying drawings. The same reference numerals are used throughout the drawings to refer to the same or like elements, and descriptions of the same elements may not be repeated. Furthermore, detailed descriptions of the same or similar effects and operations of the embodiments incorporated herein may be omitted to avoid obscuring the subject matter of the present invention.

Figure 1B:
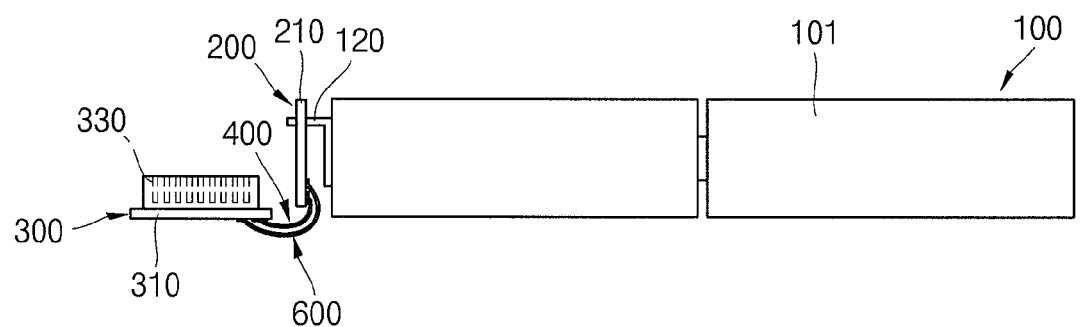
FIG. 1B is a front view of the battery pack illustrated in FIG. 1A.
Figure 1C:
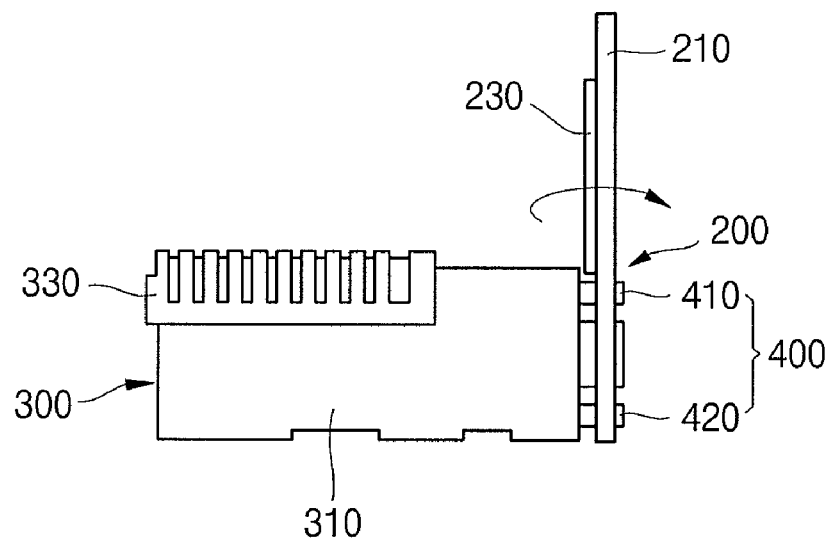
FIG. 1C is a top view of FIG. 1A with a multi-cell battery of the battery pack being removed.
Figure 1D:
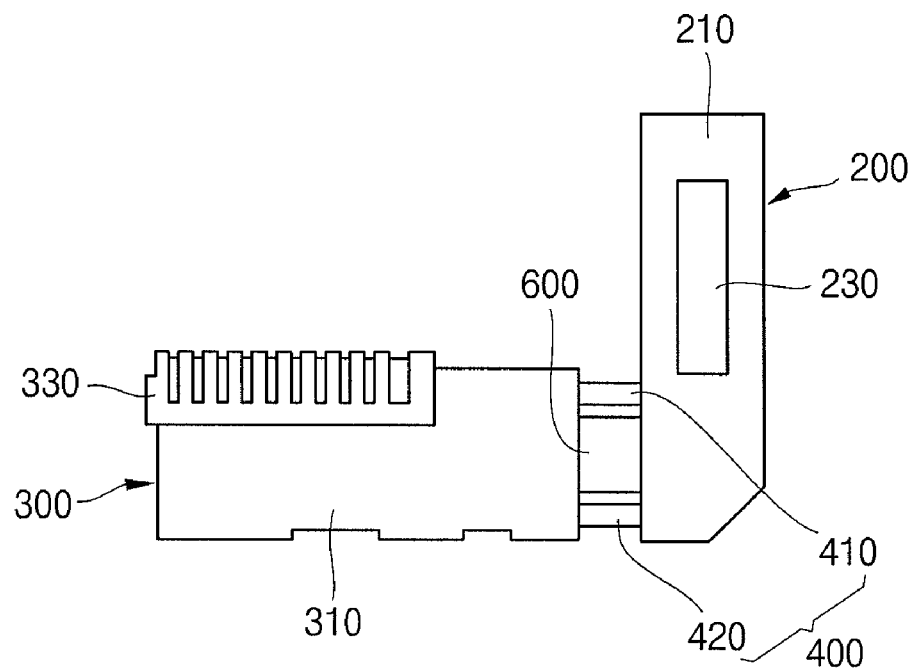
FIG. 1D is a top view of FIG. 1C with a first protective circuit board of FIG. 1A being deployed in the direction of an arrow.
Figure 1E:
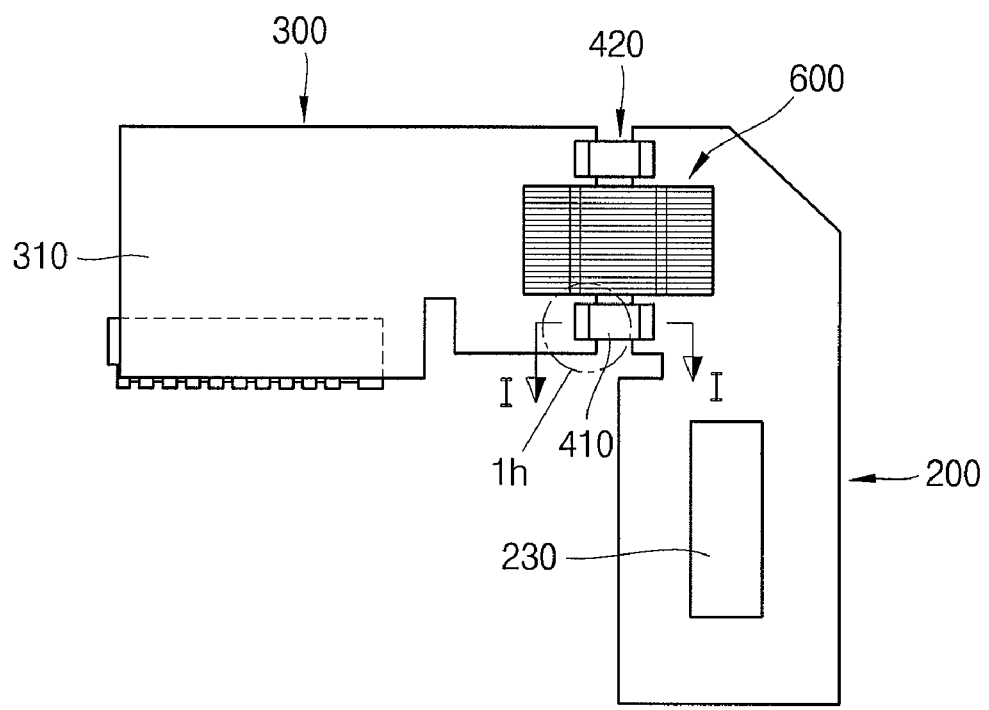
FIG. 1E is a bottom view of FIG. 1D with FIG. 1D being viewed from the bottom.
Figure 1F:
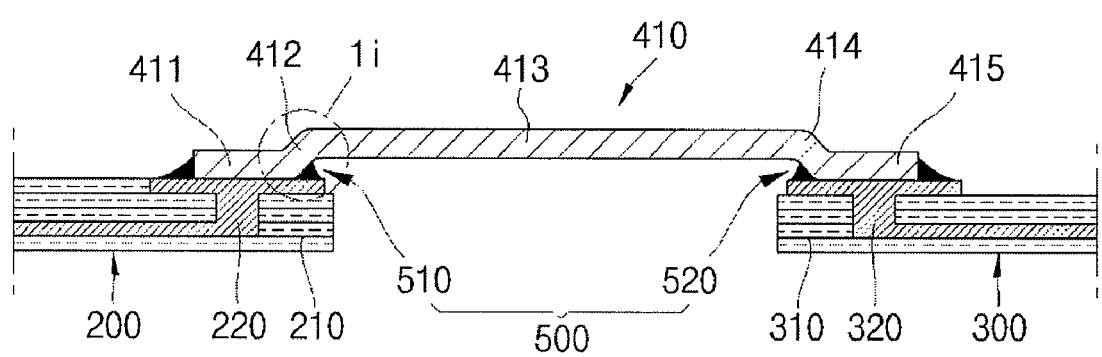
FIG. 1F is a partially cross-sectional view taken along line I-I of FIG. 1E.
Figure 1G:
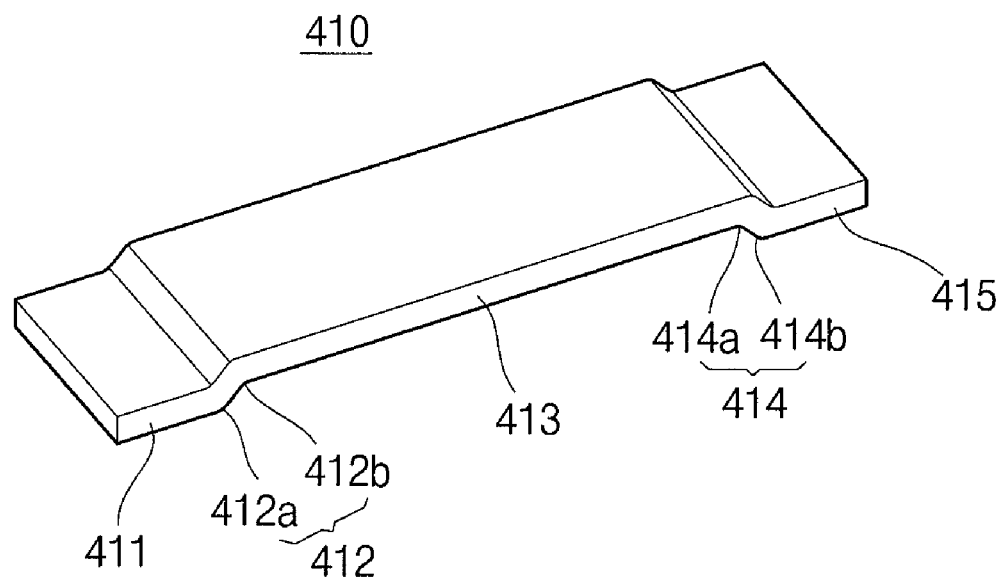
FIG. 1G is a perspective view of a conductive plate illustrated in FIG. 1E.
Figure 1H:
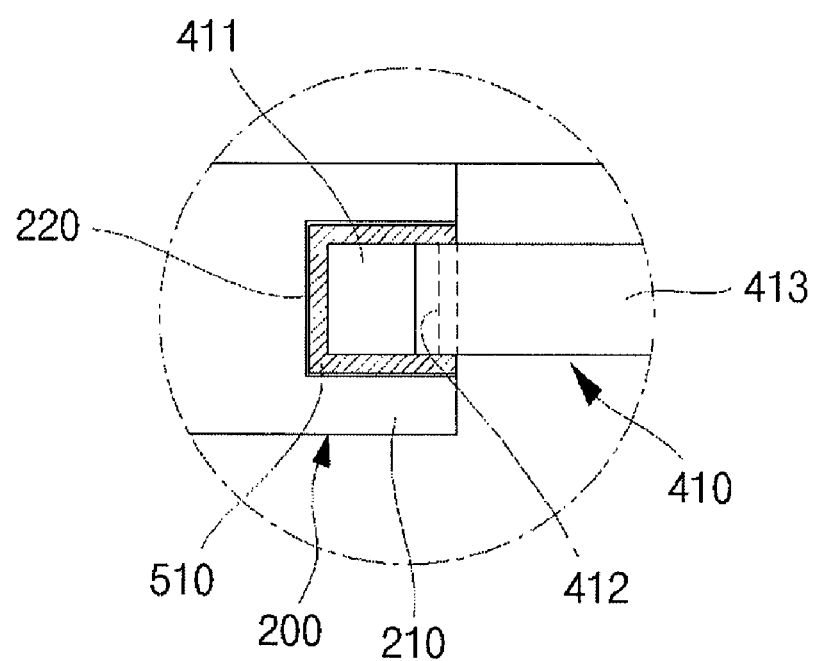
FIG. 1H is a partial bottom view obtained by enlarging a region 1$h$ illustrated in FIG. 1E.
Figure 1I:
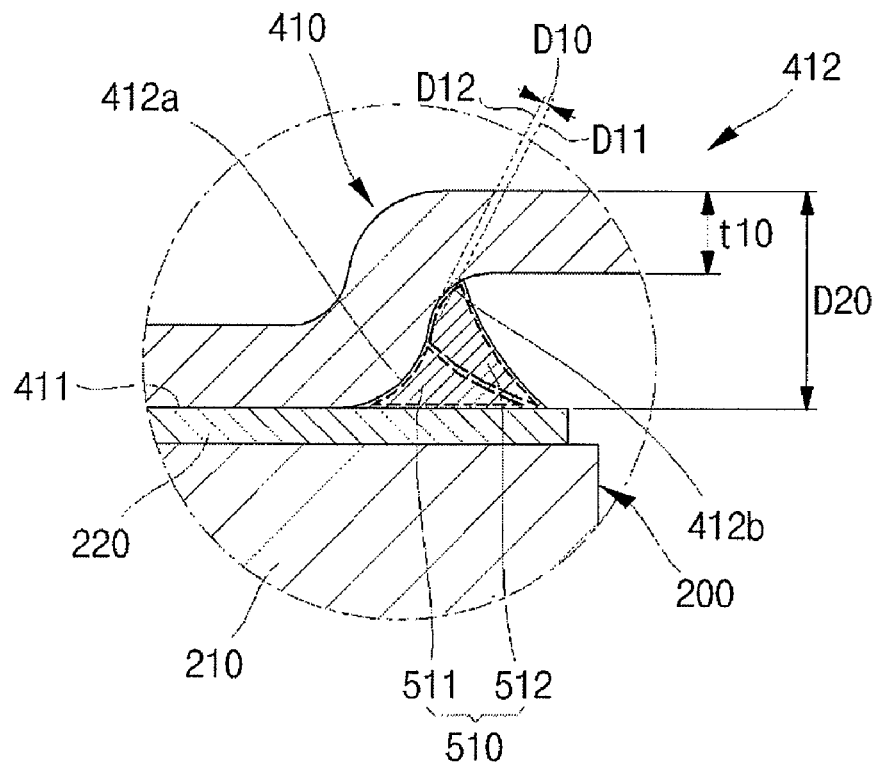
FIG. 1I is a partially cross-sectional view obtained by enlarging a region 1$i$ illustrated in FIG. 1E.

FIG. 1A is a top view illustrating a battery pack according to an embodiment of the present invention. FIG. 1B is a front view of the battery pack illustrated in FIG. 1A. FIG. 1C is a top view of FIG. 1A with a multi-cell battery of the battery pack being removed. FIG. 1D is a top view in which a first protective circuit board and a second protective circuit board are in parallel to each other by deploying the first circuit board illustrated in FIG. 1a in the direction of an arrow. FIG. 1E is a bottom view of FIG. 1D with FIG. 1D being viewed from the bottom. FIG. 1F is a partially cross-sectional view taken along line I-I of FIG. 1E. FIG. 1G is a perspective view of a conductive plate illustrated in FIG. 1E. FIG. 1H is a partial bottom view obtained by enlarging a region 1h illustrated in FIG. 1E. FIG. 1I is a partially cross-sectional view obtained by enlarging a region 1i illustrated in FIG. 1E.

As illustrated in FIGS. 1A to 1I, the battery pack 10 according to an embodiment of the present invention includes a multi-cell battery 100, a first protective circuit board 200, a second protective circuit board 300, a pair of conductive plates 400, and a pair of soldering portions 500. The battery pack 10 further includes a flexible printed circuit board 600.

The multi-cell battery 100 includes a plurality of battery cells 101. In this case, the battery 100 is a rechargeable lithium ion battery and has a positive electrode 110 and a negative electrode 120. The battery cells 101 are connected in series or in parallel to each other to form the battery 100 having the positive electrode 110 and the negative electrode 120. The battery cells 101 are electrically connected to each other through lead tabs. In the embodiment of the present invention, the plurality of battery cells 101 form a battery but one battery cell may form a battery.

The first protective circuit board 200 includes a first insulation substrate 210, a first printed circuit pattern 220, and a protective circuit 230.

The first insulation substrate 210 is formed of a resin such as epoxy resin or bakelite. A plurality of layers may be compressed in the first insulation substrate 210, and a via hole passing through the upper and lower surfaces of the first insulation substrate 210 may be formed in the first insulation substrate 210.

The first printed circuit pattern 220 is compressed and is adhered to the first insulation substrate 210. The first printed circuit pattern 220 is formed on the upper and lower surfaces of the first insulation substrate 210. The first printed circuit pattern 220 is inserted into an intermediate layer of the first insulation substrate 210.

The protective circuit 230 is electrically connected to the first printed circuit pattern 220. The protective circuit 230 is positioned on the first insulation substrate 210. The protective circuit 230 controls electrical connection for charge and discharge of the battery 100 according to the voltage of the battery 100. More particularly, the protective circuit 230 includes a passive device, a charge field effect transistor (FET), a discharge FET, a temperature device, and a control circuit. In this case, the control circuit turns on or off the charge FET and the discharge FET during charge of the battery 100 to charge or discharge the battery 100. When the temperature device detects that the temperature of the battery 100 is above a predetermined value, the control circuit turns off the charge FET and the discharge FET to prevent the battery 100 from being overheated. The control circuit detects the voltage of the battery 100, and recognizes an overcharge or overdischarge state of the battery 100 according to the detected voltage. In this case, the control circuit turns off the charge FET to prevent a charge operation of the battery 100 or turns off the discharge FET to prevent a discharge operation of the battery 100. When an over-current flows through the battery 100, the control circuit protects the battery 100 by turning off the charge FET and the discharge battery. The control circuit calculates the charge/discharge cycle of the battery 100, and extends the lifespan of the battery by controlling charge current according to the calculated charge/discharge cycle.

The second protective circuit board 300 includes a second insulation substrate 310, a second printed circuit pattern 320, and a connector 330 and also includes a second protective circuit. When the mounting space of the first protective circuit board 200 is narrow, the elements of the protective circuit 230 may be selectively mounted to the second protective circuit board 300. In this case, the second protective circuit board 300 is electrically connected to the first protective circuit board 200 through the protective plates 400 and a flexible printed circuit board 600.

The second insulation substrate 310 has the same or similar shape and material as those of the first insulation substrate 210, and detailed descriptions thereof will be omitted.

The second printed circuit pattern 320 is formed on the upper and lower surfaces and an intermediate layer of the second insulation substrate 310. The second printed circuit pattern 320 is formed in a via hole of the second insulation substrate 310. The second printed circuit pattern 320 is formed of the same conductive metal, such as copper, as that of the first printed circuit pattern 220.

The connector 330 is coupled to one surface of the second insulation substrate 310. The connector 330 includes a plurality of contact terminals and a case surrounding the contact terminals. The connector 330 is adapted to supply a high current of the positive electrode 110 and the negative electrode 120 of the battery 100 that flows through the first conductive plate 410 and the second conductive plate 420 to portable electronic appliances such as laptop computers. In this case, the conductive plates 400 electrically connect the connector 330 and the protective circuit 230 to each other to allow the protective circuit 230 to function as an electrical passage for protecting the battery 100.

The second protective circuit board 300 to which the connector 330 is mounted is separated from the first protective circuit board 200, in which case the position of the connector 330 in contact with contact terminals of a battery of a portable electronic device may be easily secured during manufacturing of a battery pack. The conductive plates 400 electrically connect the first protective circuit board 200 and the second protective circuit board 300 to each other and firmly couple the two boards to each other, enabling manufacturing of a battery pack having a stable structure.

The conductive plates 400 are a first conductive plate 410 and a second conductive plate 420. In this case, the first conductive plate 410 is electrically connected to the positive electrode 110 of the battery 100 and the second conductive plate 420 is electrically connected to the negative electrode 120 of the battery 100. In other words, the conductive plates 400 correspond to a charge/discharge high current path of the battery 100. The conductive plates 400 are formed of nickel or a nickel alloy to enhance conductivity and the coupling forces between the conductive plates 400 and the soldering portions 500 during its coupling to the printed circuit pattern.

The first conductive plate 410 includes a first electrical connection region 411, a first bending region 412, a connection region 413, a second bending region 414, and a second electrical connection region 415.

The first electrical connection region 411 is electrically connected to the first protective circuit board 200. In this case, as illustrated in FIG. 1H, a portion of the first electrical connection region 411 that makes contact with the first protective circuit board 200 has a rectangular shape, and the soldering portion 500 has a box-like shape around the portion of the first electrical connection region 411 that makes contact with the first protective circuit board 200. Accordingly, the first conductive plate 410 improves the coupling force between the first conductive plate 410 and the first protective circuit board 200, thereby providing a stable structure. The rectangular edges of the first connection region 411 may be chamfered so as to be rounded.

The area of one surface of each conductive plate 400 that makes contact with the second printed circuit pattern 320 is made to be more than 70% of that of the second printed circuit pattern 320 to improve the conductivity between the conductive plate 400 and the second printed circuit pattern 320. Further, the area of one surface of each conductive plate 400 that makes contact with the second printed circuit pattern 320 is made to be less than 90% of that of the second printed circuit pattern 320 to provide a coupling space in which the soldering portion 500 is soldered.

The first bending region 412 includes a first bending portion 412a and a second bending portion 412b.

The first bending portion 412a extends from the first electrical connection region 411, and is bent from the end of the first electrical connection region 411. The first bending portion 412a is bent counterclockwise at the first electrical connection region 411 to form an arc shape. Accordingly, an area where the soldering portion 500 can be soldered increases between the first protective circuit board 200 and the first bending portion 412a, thereby increasing the coupling force between the conductive plate 400 and the first protective circuit board 200.

The second bending portion 412b extends from the first bending portion 412a. The second bending portion 412b is bent clockwise to form an arc shape. The second bending portion 412b is bent in the direction opposite to the first bending portion 412, so that the first electrical connection region 411 and the connection region 413 are substantially parallel to each other.

The distance D10 between a first imaginary tangential line D11 tangential to a full curve point of the first bending portion 412a and a second imaginary tangential line D12 tangential to a full curve point of the second bending portion 412b is within a range of 3 to 15% of the thickness of the conductive plate 400. In other words, when the distance D10 is above 3% of the thickness of the conductive plate 400, the first bending portion 412a and the second bending portion 412b may be sufficiently bent to increase the coupling area between the conductive plate 400 and the soldering portion 500. On the other hand, if the distance D10 between the first tangential line D11 and the second tangential line D12 is above 15% of the thickness of the conductive plate 400, when the first bending portion 412a and the second bending portion 412 are excessively bent, the coupling area between the conductive plate 400 and the soldering portion 500 decreases, weakening the coupling force between the conductive plate 400 and the soldering portion 500. Accordingly, the distance D10 needs to be within a range between 3 to 15% to maintain the coupling force of the soldering portion 500.

The connection region 413 extends from the second bending portion 412b. In addition, the connection region 413 is parallel to the first electrical connection region 411.

A central portion of the connection region is bent to maintain the angle between the first protective circuit board 200 and the second protective circuit board 300 within a range of 80 to 100 degrees. The conductive plate 400 is bent as illustrated in FIG. 1b. Accordingly, the first protective circuit board 200 having the protective circuit and the second protective circuit board 300 having the connector 330 may be easily mounted longitudinally and transversely inside the battery pack.

The second bending region 414 extends from the connection region 413 and includes bending portions 414a and 414b. The bending portions 414a and 414b have shapes corresponding to those of the first bending portion 412a and the second bending portion 412b of the first bending region 412. In other words, each conductive plate 400 is symmetrical with respect to a reference line vertical to the length of the conductive plate 400, the reference line being positioned at the center of the connection region 413. Accordingly, detailed descriptions of the bending portions of the second bending region 414 will be omitted.

The second electrical connection region 415 extends from the bending portion of the second bending region 414 and is electrically connected to the second protective circuit board 300. The second electrical connection region 415 has a shape corresponding to that of the first electrical connection region 411, and only the relation with which the second electrical connection region 415 is coupled to the second protective circuit board 300 is different from the case of the first electrical connection region 411. Accordingly, detailed descriptions of the second electrical connection region 415 will be omitted.

The second conductive plate 420 is electrically connected to the negative electrode 120 of the battery 100. In this case, the second conductive plate 420 is spaced apart from the first conductive plate 410 to prevent its short circuit with the first conductive plate 410. The second conductive plate 420 has the same or similar shape and material as those of the first conductive plate 410, and detailed descriptions thereof will be omitted.

Meanwhile, as illustrated in FIG. 1I, the distance D20 from the lower surface of each conductive plate 400 and the upper surface of the conductive plate 400 spaced apart from the lower surface by the existence of the bending regions 412 and 414 is within a range of 150 to 250% of the thickness T10 of the conductive plate 400. In the embodiment of the present invention, the thickness of each conductive plate 400 is 0.35 mm to 1.1 mm. When the distance D20 is below 150% of the thickness T10 of the conductive plate 400, the space for the soldering portion 500 becomes too small, seriously decreasing the coupling force between the conductive plate 400 and the protective circuit board. On the other hand, when the distance D20 is above 250% of the thickness T10 of the conductive plate 400, the bending regions 412 and 414 of the conductive plate 400 become too long, unnecessarily increasing the mounting volume of the conductive plate 400. Meanwhile, when the thickness T10 of each conductive plate 400 is below 0.3 mm, the strength of the conductive plate 400 becomes too weak, causing the conductive plate 400 to be bent even by a small impact and to be short-circuited. On the other hand, when the thickness T10 of each conductive plate 400 is below 1.1 mm, it is difficult to form bending portions of the bending regions 412 and 414, decreasing the coupling area of the soldering portion 510, in which case the coupling force between the conductive plate 400 and the protective circuit boards 200 and 300 may be weakened.

Each soldering portion 500 couples at least one portion of the first bending region 412 of the first conductive plate 400 to the first protective circuit board 200 using solder. The soldering portion 500 couples at least one portion of the first bending region 412 of the first conductive plate 400 to the second protective circuit board 300 using solder.

As illustrated in FIG. 1F, the soldering portions 500 are a first soldering portion 510 formed between the first bending region 412 and the first protective circuit board 200 and a second soldering portion 520 formed between the second bending region 414 and the second protective circuit board 300. In other words, the first soldering portion 510 is coupled to the first protective circuit board 200 and the second soldering portion 520 is coupled to the second protective circuit board 300. Accordingly, when the centers of the conductive plates 400 are bent, the conductive plates 400 have strong coupling forces so as not to be separated from coupling surfaces of the first protective circuit board 200 and the second protective circuit board 300.

As illustrated in FIG. 1I, the first soldering portion 510 includes a coupling area securing region 511 and a coupling force reinforcing region 512. The second soldering portion 520 also includes a coupling area securing region and a coupling force reinforcing region and has a shape corresponding to that of the first soldering portion 510, in which case detailed descriptions thereof will be omitted.

The coupling area securing region 511 is formed between the first protective circuit board 200 and the first bending portion 412a. In other words, the coupling area securing region 511 is filled between the first bending portion 412a between the first electrical connection region 411 and the second bending portion 412b, and the first protective circuit board 200, maximally increasing the coupling area between the conductive plate 400 and the first protective circuit board 200.

The coupling force reinforcing region 512 extends from the coupling area securing region 511 and is formed between the first protective circuit board 200 and the second bending portion 412b. The coupling force reinforcing region 512 supports the coupling area securing region 511 for securing coupling area, further, enhancing the coupling force between the conductive plate 400 and the protective circuit board 300.

The flexible circuit board circuit board (FPCB) 600 is formed between the first conductive plate 410 and the second conductive plate 420 and electrically connects the first protective circuit board 200 and the second protective circuit board 300 to each other. The flexible printed circuit board 600 includes a plurality of copper foils and an insulation film coating the copper foils. In the flexible printed circuit board 600, the copper foils are coated with the insulation film with them being disposed side by side in a row and are integrated with the insulation film. The flexible printed circuit board 600 functions as an electrical passage through which a signal about the voltage of the battery 100 and control signals of the protective circuits are transmitted.

As shown in FIG. 1B, the flexible printed circuit board 600 is bent so as to have a shape corresponding to those of the bending regions 412 and 414 of the conductive plate 400. When a central portion of the conductive plate 400 is bent with the flexible printed circuit board not being deflected in a shape corresponding to the conductive plate 400, the central portion of the flexible printed circuit board 600 is excessively deflected and portions of the flexible printed circuit board 600 that are coupled to the printed circuit boards 200 and 300 may be separated. Accordingly, the flexible printed circuit board 600 is bent in a shape corresponding to the bending regions 412 and 414 of the conductive plate 400, preventing it from being separated from the protective circuit boards 200 and 300.

As mentioned above, the battery pack 10 according to the embodiment of the present invention allows the flow of a high current of the battery 100 using the conductive plates 400 and transmits only signals using the flexible printed circuit board 600. In other words, the protective circuit boards 200 and 300 have little possibility of being melted or short-circuited by the heat of the high current path unlike existing protective circuit boards using one flexible printed circuit board for signals and a high current path, enhancing the reliability of the battery pack 10.

Furthermore, the conductive plates 400 of the battery pack 10 that electrically connect the protective circuit boards 200 and 300 to each other are strongly coupled to the protective circuit boards 200 and 300, providing a stable structure.

Figure 2:
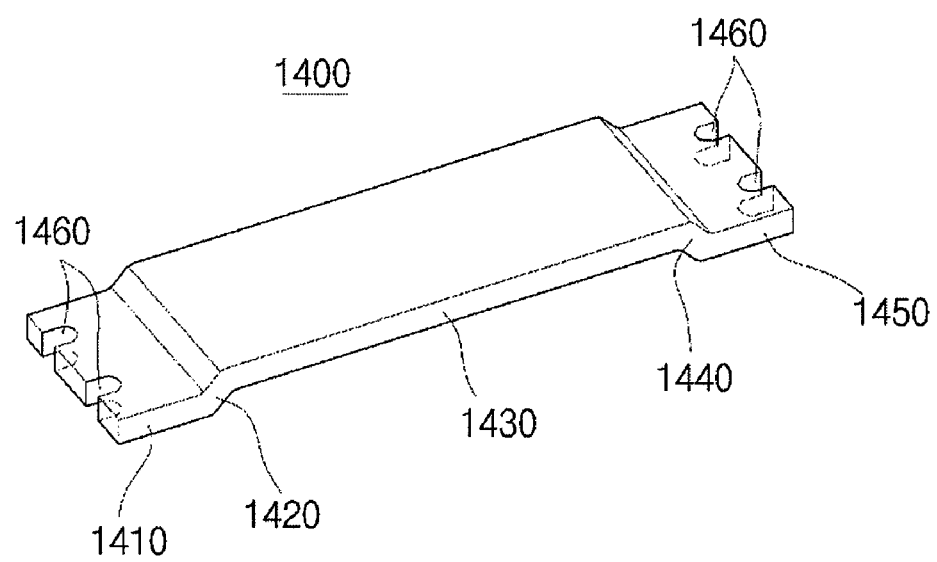
FIG. 2 is a perspective view of a conductive plate of a battery pack according to another embodiment of the present invention.

FIG. 2 is a perspective view of a conductive plate of a battery pack according to another embodiment of the present invention.

Referring to FIG. 2, the battery pack according to the embodiment of the present invention includes a multi-cell battery (not shown), a first protective circuit board (not shown), a second protective circuit board (not shown), at least one conductive plate 1400, and soldering portions (not shown). The battery pack according to the embodiment of the present invention further includes a flexible printed circuit board (not shown).

In the embodiment of the present invention, the multi-cell battery (not shown), the first protective circuit board (not shown), the second protective circuit board (not shown), the soldering portions (not shown), and the flexible printed circuit board (not shown) are the same or similar as those of the former embodiment of the present invention, and detailed descriptions thereof will be omitted. In the embodiment of the present invention, a modified conductive plate 1400 will be mainly described.

The conductive plate 1400 includes a first electrical connection region 1410, a first bending region 1420, a connection region 1430, a second bending region 1440, and a second electrical bending region 1450.

The first bending region 1420, the connection region 1430, and the second bending region 1440 have the same shapes as those of the former embodiment of the present invention, and detailed descriptions thereof will be omitted.

Soldering recesses 1460 are formed in the first electrical connection region 1410 and the second electrical connection region 1450 respectively. The soldering recesses 1460 are formed at side portions of the first electrical connection region 1410 and the second electrical connection region 1450 that make contact with the first protective circuit board and the second protective circuit board respectively. The soldering recesses 1460 increase the areas of the first electrical connection region 1410 and the second electrical region 1450, increasing the coupling area where the soldering portions are coupled. Accordingly, the conductive plate 1400 enhances the coupling forces between the conductive plate 1400 and the first protective circuit board and the second protective circuit board.

As mentioned above, the battery pack according to the embodiment of the present invention has the soldering recesses 1460 in the conductive plate 1400, enhancing the coupling forces between the conductive plate 1400 and the first protective board and the second protective circuit board.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:
1. A battery pack comprising:
a secondary battery including a positive electrode and a negative electrode;
a first protective circuit board electrically connected to the battery;
a second protective circuit board electrically connected to the first protective circuit board; and at least one conductive plate coupled to a surface of the first protective circuit board and a substantially co-planar surface of the second protective circuit board,
wherein the at least one conductive plate includes a body having bending regions, and the battery pack further includes a soldering portion for coupling the first protective circuit board and the second protective circuit to each other by soldering at least portions of the bending region to the first protective circuit board and the second protective circuit board, and
wherein a distance from the lower surface of each conductive plate and the upper surface of the conductive plate spaced apart from the lower surface by the existence of the bending regions is within a range of 150 to 250% of the thickness of the conductive plate.

2. The battery pack of claim 1, wherein the at least one conductive plate is a first conductive plate coupled to the first protective circuit board and the second protective circuit board and a second conductive plate coupled to the first protective circuit board and the second protective circuit board and spaced apart from the first conductive plate.

3. The battery pack of claim 2, wherein the first conductive plate is electrically connected to the positive electrode of the battery and the second conductive plate is electrically connected to the negative electrode of the battery.

4. The battery pack of claim 2, further comprising a flexible printed circuit board (FPCB) formed between the first conductive plate and the second conductive plate to electrically connect the first protective circuit board and the second protective circuit board to each other.

5. The battery pack of claim 4, wherein the first and second conductive plates have bending regions and wherein the flexible printed circuit board is bent in shapes corresponding to the bending regions of the first conductive plate and the second conductive plate.

6. The battery pack of claim 1, wherein the conductive plate has a first electrical connection region in contact with the first protective circuit board, a first bending region extending from the first electrical connection region, a connection region extending from the first bending region, a second bending region extending from the connection region, and a second electrical connection region extending from the second bending region and being in contact with the second protective circuit board.

7. The battery pack of claim 6, wherein the soldering portion includes a first soldering portion formed between the first bending region and the first protective circuit board and a second soldering portion formed between the second bending region and the second protective circuit board.

8. The battery pack of claim 6, wherein the first electrical connection region has a shape corresponding to that of the second electrical connection region and is opposite to the second electrical connection region with respect to the center of the connection region, and the first bending region has a shape corresponding to that of the second bending region and is opposite to the second bending region with respect to the center of the connection region.

9. The battery pack of claim 6, wherein a central portion of the connection region is bent so as to maintain the angle between the first protective circuit board and the second protective circuit board by 80 to 100 degrees.

10. The battery pack of claim 6, wherein a portion of the first electrical connection region that makes contact with the first protective circuit board has a rectangular shape, and the soldering portion has a box-like shape around the portion of the first electrical connection region that makes contact with the first protective circuit board.

11. The battery pack of claim 6, wherein the first bending region has a first bending portion bent from the first electrical connection region and a second bending portion bent in a direction opposite to that of the first bending portion.

12. The battery pack of claim 2, wherein the soldering portion corresponding to the first protective circuit board has a coupling area securing region formed between the first protective circuit board and the first bending portion and a coupling force reinforcing region connected to the coupling area securing region and being formed between the first protective circuit board and the second bending portion.

13. The battery pack of claim 2, wherein a distance between a first imaginary tangential line tangential to a full curve point of the first bending portion and a second imaginary tangential line tangential to a full curve point of the second bending portion is within a range of 3 to 15% of the thickness of the conductive plate.

14. The battery pack of claim 1, wherein the thickness of the conductive plate is 0.35 mm to 1.1 mm.

15. The battery pack of claim 1, wherein the first protective circuit board includes a first insulation substrate, a first printed circuit pattern coupled to the first insulation substrate, and a protective circuit electrically connected to the first printed circuit pattern, and the second protective circuit board includes a second insulation substrate, a second printed circuit pattern coupled to the second insulation substrate, and a connector coupled to the second insulation substrate.

16. The battery pack of claim 15, wherein the conductive plate electrically connects the connector and protective circuit to each other.

17. The battery pack of claim 15, wherein an area of one surface of each conductive plate that makes contact with the printed circuit pattern is within a range of 70 to 90% of that of the printed circuit pattern.

18. The battery pack of claim 1, wherein the conductive plate has soldering recesses around its surface in communication with the first protective circuit board and the second protective circuit board respectively.

19. The battery pack of claim 6, wherein the connection region is bendable so as to allow the second protective circuit to be mounted so as to extend in a direction that intersects the first protective circuit board.

20. The battery pack of claim 1, wherein the conductive plate has a first and a second electrical connection region that respectively couples to the first and second protective circuit board and a connecting region that extends between the first and second electrical connection region, wherein the conductive plate is shaped so that the connection region is spaced from the first and second electrical connection regions to thereby permit greater access to the electrical connection regions at the place where the electrical connection regions are coupled to the first and second protective circuit boards for welding therebetween.

* * * * *